US010323985B2

(12) United States Patent
Nissim et al.

(10) Patent No.: US 10,323,985 B2
(45) Date of Patent: Jun. 18, 2019

(54) SIGNAL PROCESSING FOR TUNABLE FABRY-PEROT INTERFEROMETER BASED HYPERSPECTRAL IMAGING (71) Applicant: TruTag Technologies, Inc., Kapolei, HI (US)

(72) Inventors: Ron R. Nissim, El Cerrito, CA (US); Timothy Learmonth, Berkeley, CA (US); Mark Hsu, Richmond, CA (US); Hod Finkelstein, Berkeley, CA (US)

(73) Assignee: TruTag Technologies, Inc., Kapolei, HI (US)

( * ) Notice: Subject to any disclaimer, the term of this patent is extended or adjusted under 35 U.S.C. 154(b) by 0 days.

(21) Appl. No.: 15/793,800

(22) Filed: Oct. 25, 2017

(65) Prior Publication Data

US 2018/0128682 A1 May 10, 2018

Related U.S. Application Data (60) Provisional application No. 62/421,887, filed on Nov. 14, 2016, provisional application No. 62/419,860, filed on Nov. 9, 2016.

(51) Int. Cl.
*G01J 3/45* (2006.01)
*G01J 3/02* (2006.01)
*G01J 3/26* (2006.01)
*G01J 3/28* (2006.01)

(52) U.S. Cl.
CPC ............... *G01J 3/45* (2013.01); *G01J 3/0297* (2013.01); *G01J 3/26* (2013.01); *G01J 3/28* (2013.01)

(58) Field of Classification Search
CPC .......... G01J 3/45; G01J 3/0297; G01J 9/0246; G02B 26/001; G02B 26/29358; G02B 5/284; G06K 2009/00644; G06K 2009/4657; G06T 2207/10036; G01B 9/02072; G01B 9/02074
USPC ........................................................ 356/454
See application file for complete search history.

(56) References Cited

U.S. PATENT DOCUMENTS

| 6,985,235 B2 | 1/2006 | Bao | |
| 7,061,618 B2* | 6/2006 | Atia | G01J 3/10 356/454 |
| 2010/0245832 A1* | 9/2010 | Saari | G01J 3/02 356/454 |

(Continued)

*Primary Examiner* — Tarifur R Chowdhury
*Assistant Examiner* — Jonathon Cook
(74) *Attorney, Agent, or Firm* — Van Pelt, Yi & James LLP (57) ABSTRACT A system for determining a calibrated spectral measurement includes a tunable Fabry-Perot etalon, a detector, and a processor. The tunable Fabry-Perot etalon has a settable gap. The detector measures light intensity. The processor is configured to determine the calibrated spectral measurement. The calibrated spectral measurement is based at least in part on a measurement set of detected light intensities for a plurality of settable gaps and a reconstruction matrix. The reconstruction matrix is based at least in part on calibration measurements. For a calibration measurement, a settable gap is selected and a set of input monochromatic source wavelengths is used to measure responses at a detector after transmission through the Fabry-Perot etalon. Each input monochromatic source wavelength is also measured using a radiometer to scale detector measurements.

17 Claims, 6 Drawing Sheets (56) References Cited

U.S. PATENT DOCUMENTS

2014/0176729 A1\* 6/2014 Saari .................... G01J 3/45
348/182
2015/0377706 A1\* 12/2015 Sano .................... G01J 3/2823
356/456

\* cited by examiner

SIGNAL PROCESSING FOR TUNABLE FABRY-PEROT INTERFEROMETER BASED HYPERSPECTRAL IMAGING

CROSS REFERENCE TO OTHER APPLICATIONS

This application claims priority to U.S. Provisional Patent Application No. 62/419,860 entitled SIGNAL PROCESSING FOR TUNABLE FABRY-PEROT INTERFEROMETER BASED HYPERSPECTRAL IMAGING filed Nov. 9, 2016 which is incorporated herein by reference for all purposes.

This application claims priority to U.S. Provisional Patent Application No. 62/421,887 entitled SIGNAL PROCESSING FOR TUNABLE FABRY-PEROT INTERFEROMETER BASED HYPERSPECTRAL IMAGING filed Nov. 14, 2016 which is incorporated herein by reference for all purposes.

BACKGROUND OF THE INVENTION

Traditional methods for acquiring three-dimensional (x,y,λ) hyper-spectral measurements typically require intensive computational efforts and expensive optical components. However, recent advances in fabrication techniques have allowed the creation of very precise tunable Fabry-Pérot etalons that can be used for making low-cost hyper-spectral measurements. These etalons have transmission spectrums that exhibit peaks of transmission as a function of a settable gap between two reflective glass optical flats. By collecting images using a sensor that collects light that has either passed through a Fabry-Perot etalon for a defined set of gaps, or has been reflected by a target illuminated by light passing through a Fabry-Perot etalon for a defined set of gaps, it is possible to reconstruct the full three-dimensional (x,y,λ) hyper-spectral data cube of what is being imaged by the camera. However, because the etalon typically transmits multiple narrow peaks in the spectral range of interest and the camera pixel sensitivity spectra are broad and fixed, there is not a simple one-to-one mapping of pixel measurements to source spectra for a given gap, making it difficult or impossible to directly interpret the spectral content of raw image measurements. Moreover, temperature variations within the instrument result in hyper-spectral measurement errors due to etalon gap shifts as well as light source spectral variations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a calibrated spectral measurement is disclosed. The system includes a tunable Fabry-Perot etalon, a detector, and a processor. The tunable Fabry-Perot etalon has a settable gap. The detector measures the light intensity. The processor is configured to determine the calibrated spectral measurement. The calibrated spectral measurement is based at least in part on a measurement set of detected light intensities for a plurality of settable gaps and a reconstruction matrix. The reconstruction matrix is based at least in part on calibration measurements. For a calibration measurement a settable gap is selected and a set of input monochromatic source wavelengths is used to measure responses at a detector after transmission through the Fabry-Perot etalon, and wherein each input monochromatic source wavelength is also measured using a radiometer to scale detector measurements.

A system for determining a calibrated spectral measurement comprises an illumination source, a Fabry-Perot etalon with a settable gap, an optical system filter, and an optical sensor array (e.g., a camera). The optical system filter sets the range over which the target spectrum is acquired and helps to constrain and thereby improve the spectral reconstruction associated with the target. To acquire a three-dimensional (x,y,λ) hyper-spectral cube measurement of the target, a controller sets the illumination source, gathers temperature measurements of the system components, and acquires a set of images from the camera for a set of settings of the etalon gap. These images are indexed by the gap value and stored in a data scan memory. Once a complete set of images has been acquired (e.g., one for each of the set of settings of the etalon gap), the controller sends a READ signal to a spectrum calculator. The spectrum calculator uses a previously calculated calibrated reconstruction matrix and a set of gap images to estimate the target's optical spectrum.

A matrix product, consisting of the indexed gap images and the reconstruction matrix, is used to calculate an optical spectrum estimate.

A system for determining a calibrated reconstruction matrix comprises a settable structured illumination source, a calibrated radiometer for measuring the illumination source spectrum power, a Fabry-Perot etalon with a settable gap, an optical system filter, and an optical sensor array such as a camera. The optical system filter sets the range over which the target spectrum is acquired. A calibration controller sets the settable structured illumination source to one of a set of illumination structure types (e.g., a narrow band illumination defined by its peak frequency) and to one of a set of settable gaps of the Fabry-Perot etalon. For each gap and illumination type, the controller stores the measured illumination power and an image from the camera in a calibration scan memory. Once all sets of illumination types and etalon gaps have been acquired in the calibration scan memory, the controller sends a calibration signal to the calibration processor to process the calibration scan data. The calibration processor calculates the reconstruction matrix using a linear model with regularization (e.g. L1, L2, or L0 regularization) and stores the resulting reconstruction matrix (e.g., in a reconstruction matrix memory).

In contrast to traditional Fabry-Perot etalon-based spectrometers that attempt to estimate the source spectrum from independent gap measurements, the disclosed system for hyper-spectral cube measurements is able to resolve ambiguities and eliminate spectral estimation artifacts by using information from the full set of gap measurements. In addition, the framework disclosed is able to work with a wide variety of illumination source types including narrow band, multiband, and broadband, as well as a wide variety of cameras such as a red-green-blue (RGB) camera, a red-green-blue and infrared (RGB+IR) camera, a monochrome camera, or a multispectral camera.

Figure 1:
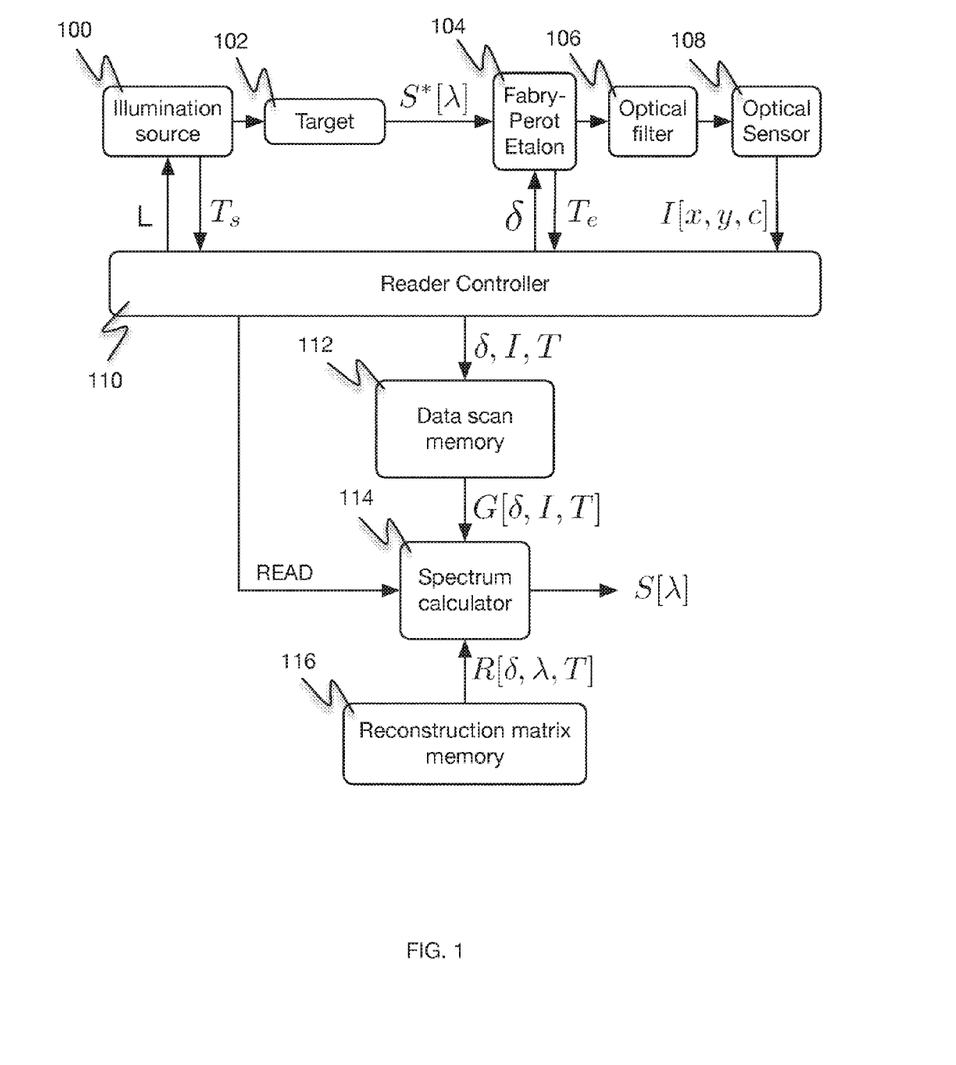
FIG. 1 is a block diagram illustrating an embodiment of a calibrated spectral measurement system.

FIG. 1 is a block diagram illustrating an embodiment of a calibrated spectral measurement system. In the example shown, target 102 is illuminated with illumination source 100. The parameters specifying illumination source 100 are provided by a signal L. Light from illumination source 100 is scattered by target 102 with spectrum $S^*(\lambda)$ and passes through Fabry-Perot etalon 104 with a settable gap specified by a signal S. The system includes optics (e.g., a lens to collimate the light from the illumination source) to collimate light that enters the Fabry-Perot etalon. Light coming out of Fabry-Perot etalon 104 passes through optical filter 106 (e.g., a broad band-pass filter) and is detected by optical sensor 108. Filter 106 may incorporate a fixed spectral bandpass filter (or a low pass and high pass combination which creates an effective bandpass filter). Temperature sensors on Fabry-Perot etalon 104 generate temperature signal Te and temperature sensors on the illumination source 100 generate temperature signal Ts. Reader controller 110 receives image data I[x,y,c] from optical sensor 108 for each setting of the Fabry-Perot gap δ and light source L and stores the image data I[x,y,c] and temperature data (Te,Ts) for each gap setting δ in data scan memory 112. For example, the image data I contains c pixel types (e.g., red, green, blue) at locations x,y. Temperature data (Te,Ts) can be used by spectrum calculator 114 or in some cases reader controller 110 to compensate for temperature sensitive measurements. For example, the pass bands of Fabry-Perot etalon 104 shift with temperature for a fixed gap setting δ. After a complete set of data has been acquired for each gap setting δ, reader controller 110 sends a READ signal to spectrum calculator 114 instructing it to calculate the target spectrum estimate S[λ]. Spectrum calculator 114 reads in the data from data scan memory 112 as matrix G[δ,I,T] and reads in a reconstruction matrix R[δ,λ,T] from reconstruction matrix memory 116. Spectrum calculator 114 then multiplies matrix G[δ,I,T] by matrix R[δ,λ,T] to get the target spectrum estimate S[λ] using the current temperature T of the system. In some embodiments, Te is used directly by reader controller 110 to adjust the gap to compensate for the temperature of the etalon. In some embodiments, where there are multiple pixel values (x,y) processed by spectrum calculator 114, the spectral estimate S[λ] will be a three-dimensional S[x,y,λ] hyper-spectral measurement.

In some embodiments, illumination source 100 is a broadband source such as a halogen lamp. In some embodiments, illumination source 100 is a composite source such an array of light emitting diodes (LEDs). In some embodiments, illumination source 100 is optimized for the detection of particular target by matching the illumination source spectrum to the target's reflection spectrum. In some embodiments, Fabry-Perot etalon 104 comprises a pair of cascaded Fabry-Perot etalons with settable gaps specified by a pair of signals [δ1, δ2]. In contrast to a single Fabry-Perot etalon, which typically has multiple peaks of transmission in the range of interest, a pair of cascaded Fabry-Perot etalons with different gap settings can be set to pass a single narrow band of light in the range of interest. For example, if the gaps [δ1, δ2] specify different transmission orders for the two etalons, a single narrow band of transmission is passed. Detection of such a single band of light from a pair of cascaded Fabry-Perot etalons by optical sensor 108 resolves the ambiguity associated with assigning spectral estimates to multiple bands when using a single Fabry-Perot etalon.

In various embodiments, optical sensor 108 comprises a red-green-blue (RGB) detector or camera, a red-green-blue and infrared (RGB+IR) detector or camera, a monochrome detector or camera, a multispectral or multiple band detector or camera, IR camera, or any other appropriate sensor.

In various embodiments, optical sensor 108 includes a temperature sensor. For example, optical sensor 108 sends its temperature $T_I$ to reader controller 110 in order that spectrum calculator 114 compensates for optical sensor 108 temperature variability.

In some embodiments, the spectral estimate S[λ] are a spatially weighted average. For example, the spectral estimate S[λ] is an average over the central region of optical sensor 108. In some embodiments, the three-dimensional spectral estimate S[x,y,λ] will be a spatially weighted average from a plurality of sensor regions.

In some embodiments, spectrum calculator 114 uses a priori knowledge of the target spectrum to estimate spectral features of the target. For example, if the target spectra $S^*(\lambda)$ is known to have a finite number of peaks, spectrum calculator 114 may use a reconstruction matrix designed to map the peaks in the optical sensor measurement to peaks in the spectral estimate S[λ].

In some embodiments, reconstruction matrix memory 116 contains multiple reconstruction matrices optimized for various conditions of the device. For example, spectrum calculator 114 for various temperature conditions of the device may use a plurality of reconstruction matrices.

In some embodiments, reconstruction matrix memory 116 contains reduced descriptions of the reconstruction matrix for faster spectral estimation and better noise immunity. For example, the reconstruction matrix is estimated using a small number of principle components. This estimated reconstruction matrix comprises a reduced reconstruction matrix (determined using the reduced description of the reconstruction matrix) that is used in place of the reconstruction matrix.

Figure 2:
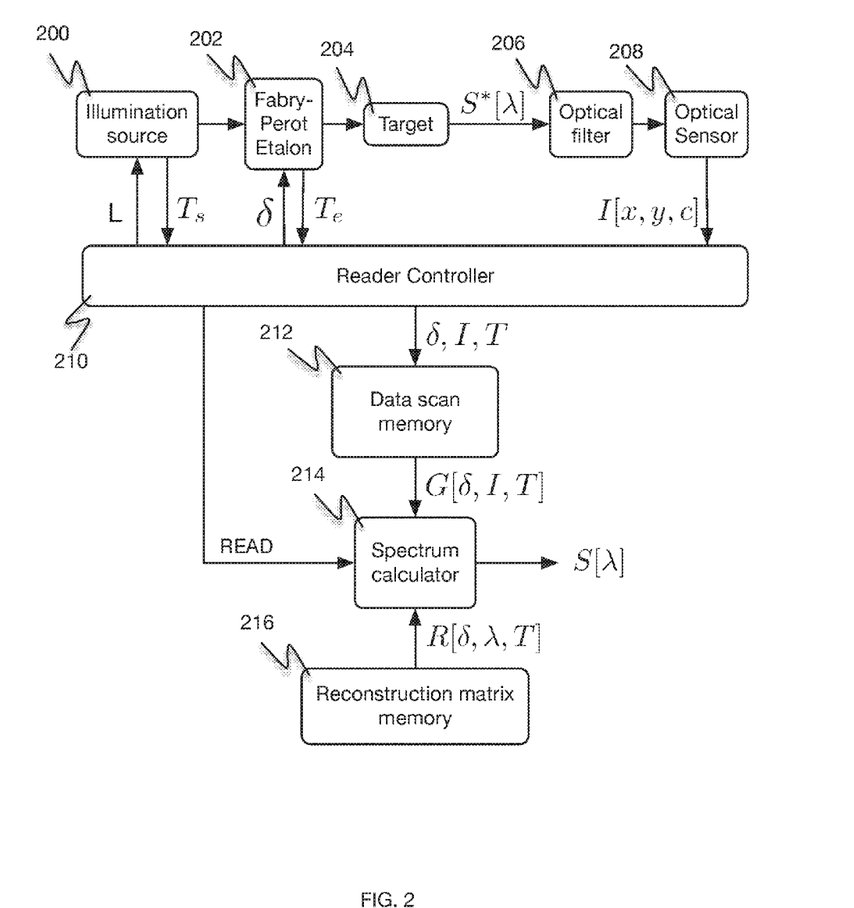
FIG. 2 is a block diagram illustrating an embodiment of a calibrated spectral measurement system.

FIG. 2 is a block diagram illustrating an embodiment of a calibrated spectral measurement system. In the example shown, target 204 is illuminated with illumination source 200 that has been filtered by Fabry-Perot etalon 202. The parameters specifying illumination source 200 are provided by a signal L. Light from illumination source 200 passes through Fabry-Perot etalon 202 with a settable gap specified by a signal δ and is scattered by target 204 resulting in the transmission of spectrum S*(λ) through the optical filter 206 to the optical sensor 208. The system includes optics (e.g., a lens to collimate the light from the illumination source) to collimate light that enters Fabry-Perot etalon 202. Light scattered by target 204 passes through an optical filter 206 (e.g., a broad band-pass filter) and is detected by optical sensor 208. Optical filter 206 may incorporate a fixed spectral band-pass filter (or a low pass and high pass combination which creates an effective band-pass filter). Temperature sensors on the Fabry-Perot etalon 202 generate temperature signal Te and temperature sensors on the illumination source 200 generate temperature signal Ts. Reader controller 210 receives image data I[x,y,c] from optical sensor 208 for each setting of the Fabry-Perot gap δ and light source L and stores the image data I[x,y,c] and temperature data (Te,Ts) for each gap setting δ in data scan memory 212. For example, the image data I contains c pixel types (e.g. red, green, blue) at locations x,y. Temperature data (Te,Ts) can be used by spectrum calculator 214 to compensate for temperature sensitive measurements. For example, the pass bands of Fabry-Perot etalon 202 shift with temperature for a fixed gap setting δ. After a complete set of data has been acquired for each gap setting δ, reader controller 210 sends a READ signal to a spectrum calculator instructing it to calculate the target spectrum estimate S[λ]. Spectrum calculator 214 reads in the data from data scan memory 212 as matrix G[δ,I,T] and reads in a reconstruction matrix R[δ,λ,T] from reconstruction matrix memory 216. Spectrum calculator 214 then multiplies matrix G[δ,I,T] by matrix R[δ,λ,T] to get the target spectrum estimate S[λ] using the current temperature T of the system. In some embodiments, where there are multiple pixel values (x,y) processed by spectrum calculator 214, the spectral estimate S[λ] will be a three-dimensional S[x,y,λ] hyper-spectral measurement.

In some embodiments, illumination source 200 is a broadband source such as a halogen lamp. In some embodiments, illumination source 200 is a composite source such as an array of LEDs. In some embodiments, illumination source 200 is optimized for the detection of a particular target by matching the illumination source spectrum to the target's reflection spectrum. In some embodiments, Fabry-Perot etalon 202 is a pair of cascaded Fabry-Perot etalons with settable gaps specified by a pair of signals [δ1, δ2]. In contrast to a single Fabry-Perot etalon, which typically has multiple peaks of transmission in the range of interest, a pair of cascaded Fabry-Perot etalons with different gap settings can be set to pass a single narrow band of light in the range of interest. For example, if the gaps [δ1, δ2] specify different transmission orders for the two etalons, a single narrow band of transmission is passed. Detection of such a single band of light from a pair of cascaded Fabry-Perot etalons by optical sensor 208 resolves the ambiguity associated with assigning spectral estimates to multiple bands when using a single Fabry-Perot etalon.

In various embodiments, optical sensor 208 comprises a red-green-blue (RGB) camera, a red-green-blue and infrared (RGB+IR) camera, a monochrome camera, a multi spectral camera, an IR camera, or any other appropriate sensor.

In various embodiments, optical sensor 208 includes a temperature sensor. For example, optical sensor 208 sends its temperature to reader controller 210 in order that spectrum calculator 214 compensates for optical sensor 208 temperature variability.

In some embodiments, the spectral estimate S[λ] will be a spatially weighted average. For example, the spectral estimate S[λ] is an average over the central region of optical sensor 208. In some embodiments, the three-dimensional spectral estimate S[x,y,λ] will be a spatially weighted average from a plurality of sensor regions.

In some embodiments, spectrum calculator 214 uses a priori knowledge of the target spectrum to estimate spectral features of the target. For example, if the target spectra S*(λ) is known to have a finite number of peaks, spectrum calculator 214 may use a reconstruction matrix designed to map the peaks in the optical sensor measurement to peaks in the spectral estimate S[λ].

In some embodiments, reconstruction matrix memory 216 contains multiple reconstruction matrices optimized for various conditions of the device. For example, spectrum calculator 214 for various temperature conditions of the device may use a plurality of reconstruction matrices.

In some embodiments, reconstruction matrix memory 216 contains reduced descriptions of the reconstruction matrix for faster spectral estimation and better noise immunity. For example, the reconstruction matrix is estimated using a small number of principle components. This estimated reconstruction matrix comprises a reduced reconstruction matrix (determined using the reduced description of the reconstruction matrix) that is used in place of the reconstruction matrix.

Figure 3:
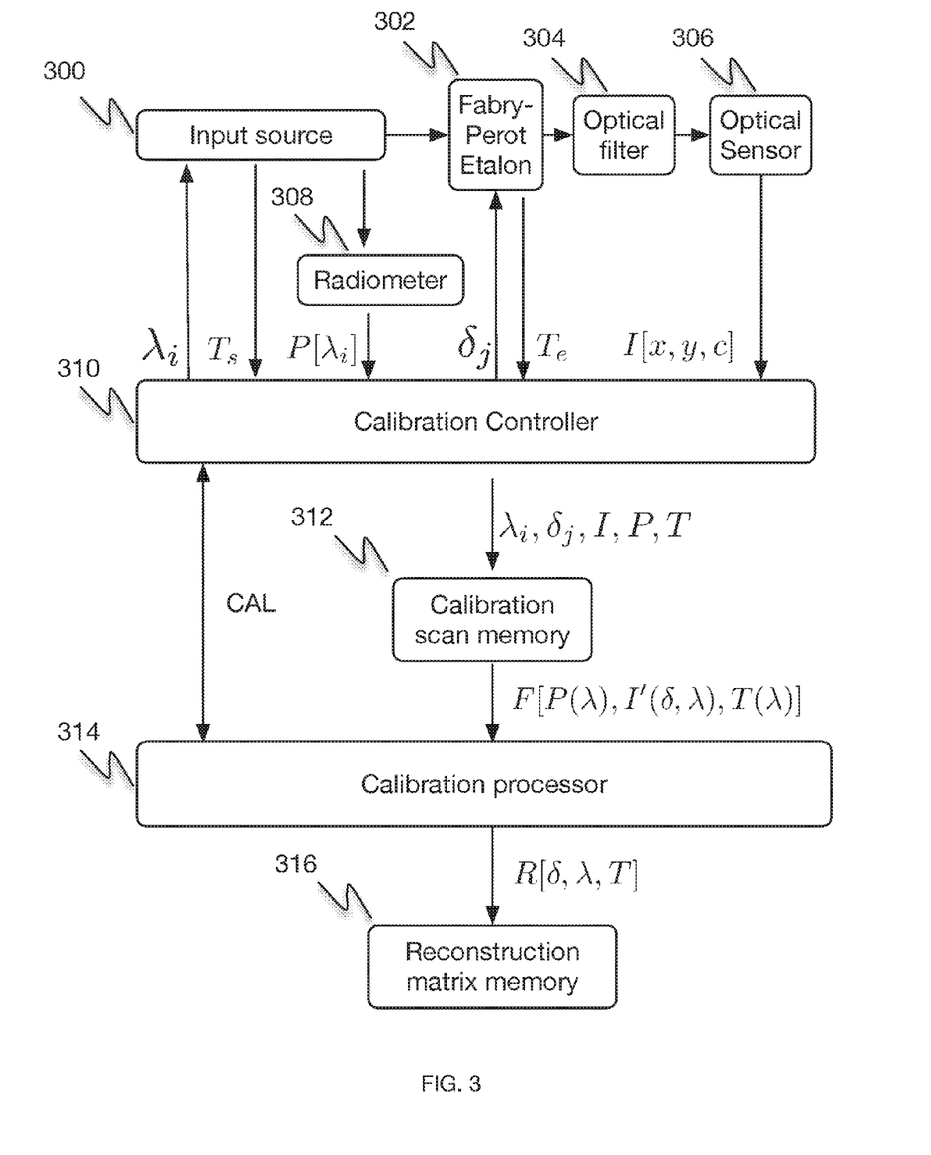
FIG. 3 is a block diagram illustrating an embodiment of a system to calibrate a spectral measurement system.

FIG. 3 is a block diagram illustrating an embodiment of a system to calibrate a spectral measurement system. In various embodiments, the system of FIG. 3 is used to calibrate the system of FIG. 1 or FIG. 2. In the example shown, light from input source 300 is set to one of a plurality of spectral structure types specified by λi. For example, λi may specify a narrow band light source (e.g., a light source with half-width of 2 nm) with center wavelength equal to λi. In some embodiments, the input source includes multi-peaked types or broadband spectra types where the types are specified by the parameter λi. The light from input source 300 with spectra type λi is passed to radiometer 308 and Fabry-Perot etalon 302. Radiometer 308 records the measured optical power P[λi] generated by input source 300 with spectral structure specified by λi. Light from input source 300 with spectrum S(λi) passes through Fabry-Perot etalon 302 with a settable gap specified by a signal δj. Light coming out of Fabry-Perot etalon 302 passes through optical filter 304 (e.g., a broad band-pass filter) and is detected by optical sensor 306.

Calibration controller 310 receives image data I[x,y,c] from optical sensor 306, temperature data Te from Fabry-Perot etalon 302, temperature data Ts from input source 300, and optical power P[λi] from radiometer 308 for each setting of the Fabry-Perot gap δj and light source type λi. Calibration controller 310 stores the image data I[x,y,c], measured optical power P[λi], and temperature (Te,Ts) for each gap setting δj and input source type λi in calibration scan memory 312. After a complete set of data F[P(λi),I(δj,λi),T(λi)] has been acquired for each gap setting δj and each input source type λi, calibration controller 310 sends a CAL signal to calibration processor 314 instructing it to calculate the reconstruction matrix R[δ,λ,T] using calibration scan memory 312. Calibration processor 314 then reads in the calibration data $F[P(\lambda), I(\delta,\lambda), T(\lambda)]$ from calibration memory 312 and computes a reconstruction matrix R using a linear model S=RI to estimate the input source spectrum S. For example, the optimal reconstruction matrix can be computed using a least squares cost function between the linear model S=RI and the measured spectrum together with L1 regularization or ridge regularization. In various embodiments, the optimal reconstruction matrix is computed using a least squares cost function between the linear model S=RI and the measured spectrum together with L1 or L0 regularization. In various embodiments, LASSO, stochastic gradient decent, or expectation-maximization methods are used for L1 regularization but any equivalent method may be used to solve the linear model with a convex cost function. In various embodiments, orthogonal matching pursuit or locally competitive algorithms are used for L0 regularization but any equivalent method may be used to solve the linear model. Calibration processor 314 then stores the optimal reconstruction matrix $R[\lambda]$ in reconstruction matrix memory 316. In some embodiments, the linear model has a constant term. For example, the linear model is S=RI+R0 where R0 is a constant term. In some embodiments, R is determined using a pseudo-inverse. For example, a radiometer is used to measure the transmitted power at each wavelength $\lambda i$ and gap setting $\delta j$. For each gap setting $\delta j$, a narrowband source $\lambda i$ is scanned over the spectral range and the average red, green, and blue values from the sensor 306 at each wavelength setting $\lambda i$ are scaled by the radiometer output and saved. The transmission spectrum for each gap $\delta j$ is placed into a row of a matrix that when inverted using the pseudo-inverse, results in the reconstruction matrix R.

In some embodiments, the spectrum of illumination source 300 comprises multiple narrow bands. For example, illumination source 300 may be generated from broadband source such as a halogen lamp that is passed through a second Fabry-Perot etalon. In some embodiments, illumination source 300 is a composite source such as an array of LEDs.

In various embodiments, optical sensor 306 comprises a red-green-blue (RGB) camera, a red-green-blue and infrared (RGB+IR) camera, a monochrome camera, a multi spectral camera, or any other appropriate sensor.

In some embodiments, the image data I will be a spatially weighted average. For example, the image data is an average over the central region of optical sensor 306. In some embodiments, the image data I will be a spatially weighted average from a plurality of sensor regions.

In some embodiments, calibration processor 314 uses a priori knowledge of the target spectrum to estimate spectral features of the target. For example, if the target spectra $S^*(\lambda)$ is known to have a finite number of peaks, calibration processor 314 may calculate a reconstruction matrix designed to map the peaks in the optical sensor measurement to peaks in the spectral estimate $S[\lambda]$.

In some embodiments, reconstruction matrix memory 316 contains multiple reconstruction matrices optimized for various conditions of the device. For example, calibration processor 314 may calculate a reconstruction matrix for various temperature conditions of the device.

In some embodiments, reconstruction matrix memory 316 contains reduced descriptions of the reconstruction matrix for faster spectral estimation and better noise immunity. For example, the reconstruction matrix is estimated using a small number of principle components. This estimated reconstruction matrix comprises a reduced reconstruction matrix (determined using the reduced description of the reconstruction matrix) that is used in place of the reconstruction matrix.

Figure 4:
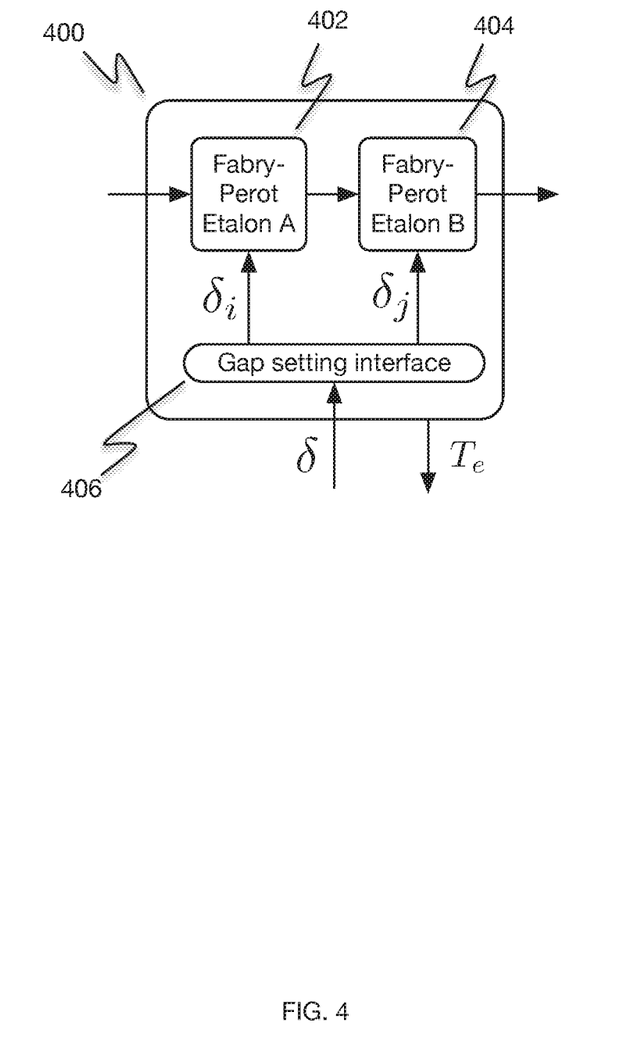
FIG. 4 is a block diagram illustrating an embodiment of a cascaded Fabry-Perot etalon module.

FIG. 4 is a block diagram illustrating an embodiment of a cascaded Fabry-Perot etalon module. In various embodiments, Fabry-Perot etalon module 400 is used to implement Fabry Perot 104 of FIG. 1, Fabry-Perot etalon 202 of FIG. 2, or Fabry-Perot etalon 302 of FIG. 3. In the example shown, light enters cascaded Fabry-Perot etalon module 400 and passes though Fabry-Perot etalon A 402 with a settable gap specified by a signal $\delta i$ and through Fabry-Perot etalon B 404 with a settable gap specified by a signal $\delta j$. Settable gaps $\delta i$ and $\delta j$ are generated by gap setting interface 406 that receives the gap setting parameters $\delta$. Fabry-Perot etalon module 400 comprises temperature sensor 408 that measures the temperature of the Fabry-Perot etalon module and outputs the temperature of the module as Te. A spectrum calculator can use temperature Te to compensate for spectral response variations due to temperature. For example, the pass bands of Fabry-Perot etalon A 402 or Fabry-Perot etalon B 404 shift with temperature for a fixed gap setting $\delta$. In some embodiments, settable gaps $\delta i$ and $\delta j$ are configured to use different transmission orders of the Fabry-Perot etalon A 402 and Fabry-Perot etalon B 404 such that only a single narrow spectral band is passed.

Figure 5:
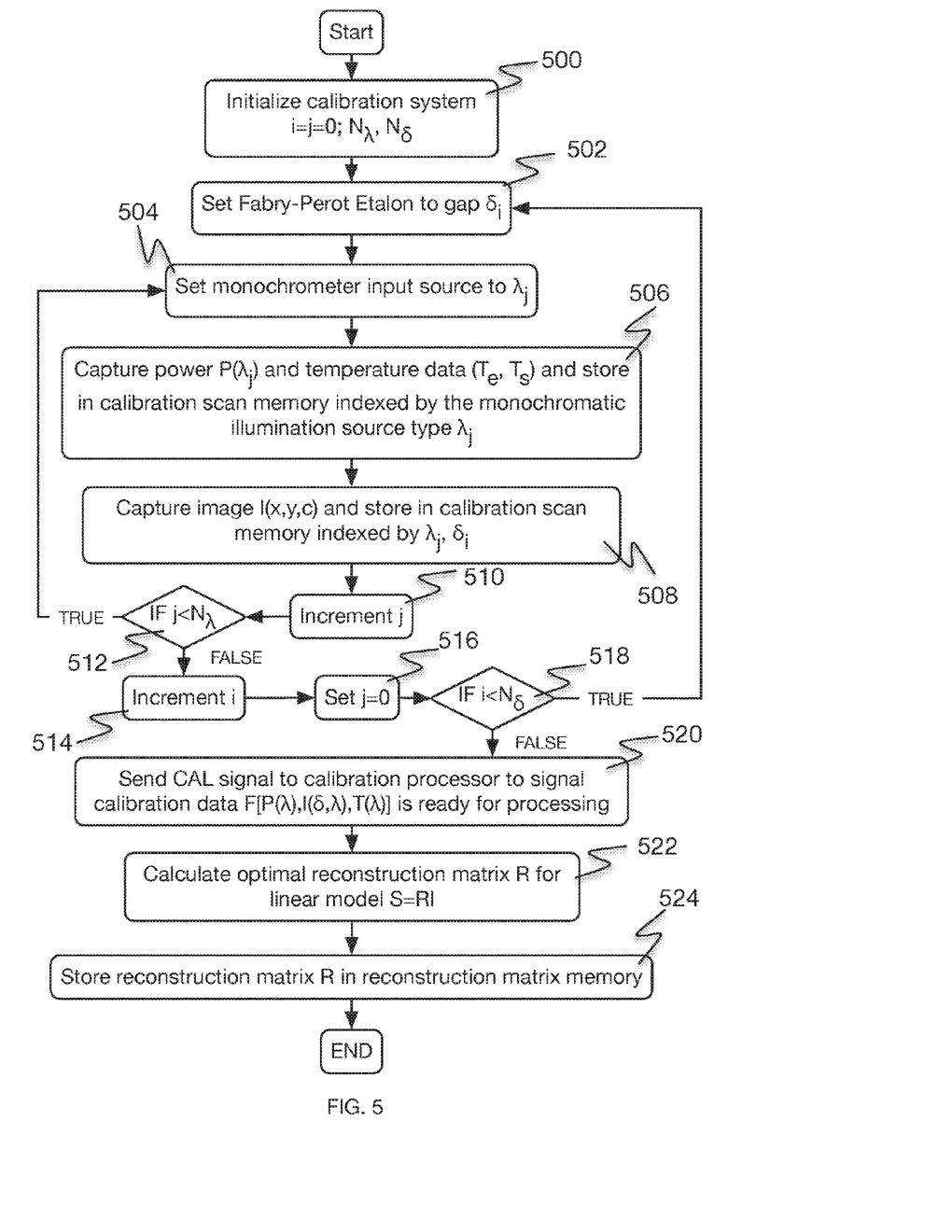
FIG. 5 is a flow diagram illustrating an embodiment of a process for calibrating a spectral measurement system.

FIG. 5 is a flow diagram illustrating an embodiment of a process for calibrating a spectral measurement system. In various embodiments, the process of FIG. 5 is used to calibrate the system of FIG. 1 or FIG. 2. In some embodiments, the process of FIG. 5 is executed by the system shown in FIG. 3. In the example shown, in 500, a calibration system is initialized. For example, the index i (for the set of Fabry-Perot gap settings $\delta i$) and the index j (for the set of input source spectral structure types $\lambda j$) are set to zero; and the number N (for gap settings $N\delta$ and source types $N\lambda$) is defined. In 502, the gap for the Fabry-Perot etalon is set to $\delta i$. The setting of the gap for the Fabry-Perot etalon results in spectrally filtered light, which is then imaged at an optical sensor. For example, $\delta i$ might set the Fabry-Perot etalon to a 500 nm gap for i=0. In 504, the monochromatic illumination source type is set to $\lambda j$. In 506, the optical power $P(\lambda j)$ for monochromatic illumination source type $\lambda j$ and temperature data (Te,Ts) is captured and stored in calibration scan memory indexed by the monochromatic illumination source type $\lambda j$. In 508, an optical sensor image I(x,y,c) is captured and stored in a calibration scan memory indexed by $\lambda j$ and $\delta i$. For example, an image I[x,y,c] is captured of the light from input source type $\lambda j$ that has passed through the Fabry-Perot etalon with gap setting $\delta i$. In some embodiments, the optical sensor is a high definition RGB camera and the data image I has dimensions I[1920,1080,3]. The data image I is stored in the calibration scan memory indexed by input source type $\lambda j$ and etalon gap type $\delta i$. For example, each image I in the data scan memory is indexed by a specific gap setting $\delta i$ and specific source type $\lambda j$.

In 510, j is incremented. For example, monochromatic illumination source type setting index j is incremented (e.g., j is increased by 1). In 512, it is determined whether j is less than $N_\lambda$. For example, the index j is compared to the maximum value $N_\lambda$. If j is less than $N_\lambda$, control passes to 504. For example, in the event that the index j is less than the maximum $N_\lambda$, then the scanning dataset is not yet complete and the next illumination source type is set in 504 and the data capturing process continues in 506. In the event that j is not less than $N_\lambda$, then control passes to 514. For example, if the index j is greater than or equal to the maximum $N_\lambda$, the data capturing process loop ends for scanning over all illumination source types. In 514, i is incremented. For example, the etalon gap index i is incremented (e.g., i is increased by 1). In 516, j is set equal to 0. For example, the monochromatic illumination source index j is reset to zero in preparation for a scan over all $N_\lambda$ source types for a new etalon gap setting δi. In 518, it is determined whether i is less than Nδ. For example, the index i is compared to the maximum value Nδ. In the event that i is less than Nδ, control passes to 502. For example, in the event that the index i is less than the maximum Nδ, then the scanning dataset is not yet complete and the next etalon gap type δi is selected and the data capturing process continues in 504, 506, and 508. In the event that i is not less than Nδ, then control passes to 520. For example, in the event that the index i is greater than or equal to the maximum Nδ, the data capturing process loop ends.

In 520, a CAL signal is sent to the calibration processor to signal that the calibration data F[P(λ,j),I(δi,λ,j),T(λ,j)] is ready for processing. In 522, optimal reconstruction matrix R is calculated for linear model S=RI. For example, calibration processor then reads in the calibration data F[P(λ,j), I(δi,λ,j),T(λ,j)] from the calibration memory and computes a reconstruction matrix R for a linear model S=RI to estimate the input source spectrum S using least squares and L1 or ridge regularization. In 524, reconstruction matrix R is stored in reconstruction matrix memory. For example, the calibration processor stores the optimal temperature-compensated reconstruction matrix R[δ,λ,T] in the reconstruction matrix memory.

Figure 6:
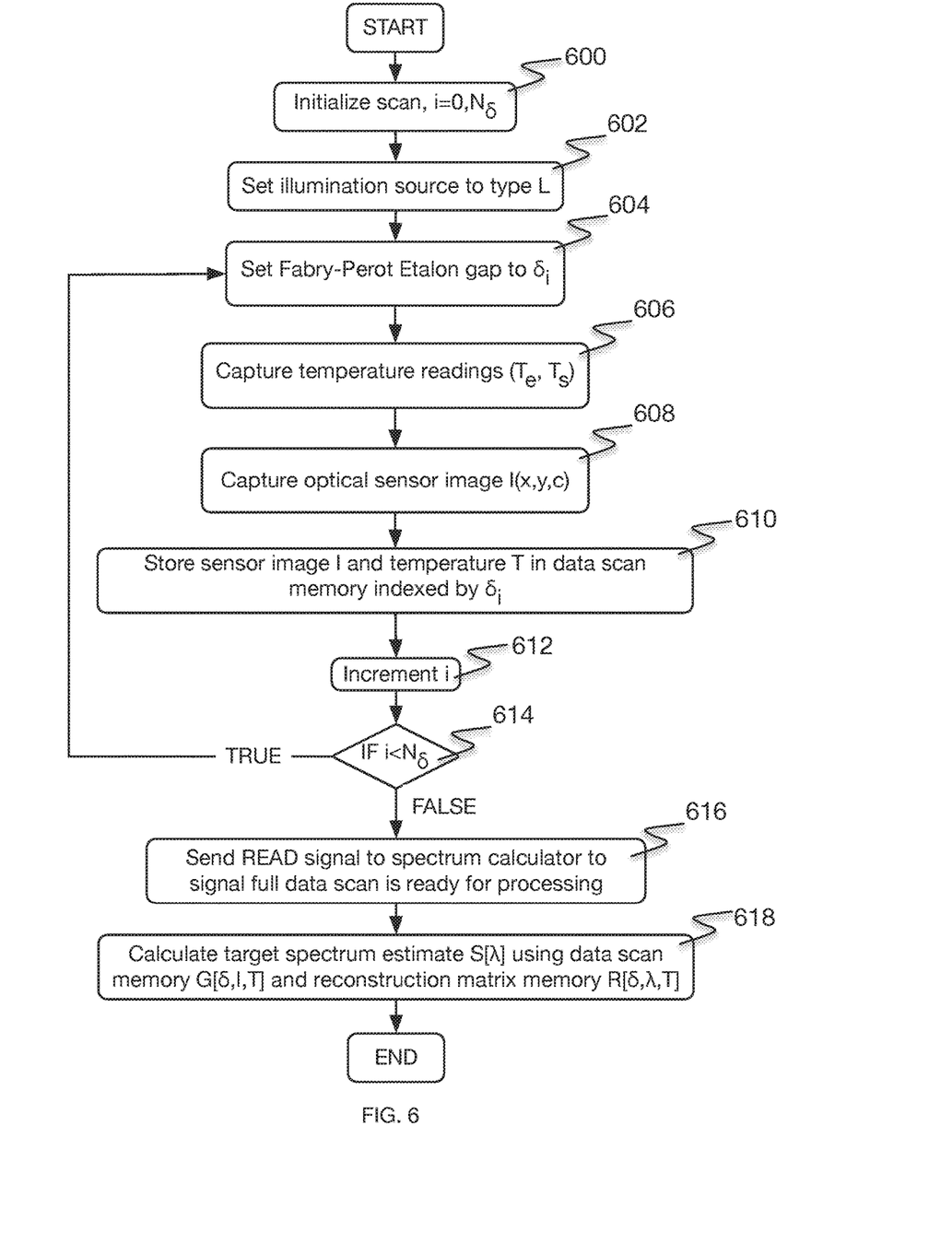
FIG. 6 is a flow diagram illustrating an embodiment of a process for reading a calibrated spectral measurement.

FIG. 6 is a flow diagram illustrating an embodiment of a process for reading a calibrated spectral measurement. In some embodiments, the process of FIG. 6 is executed by the system shown in FIG. 1 or FIG. 2. In the example shown, in 600, a scan is initialized. For example, the spectral measurement system is initialized; the index i for the set of Fabry-Perot gap settings δi is set to zero; and the number of gap settings Nδ is defined. In 602, the illumination source is changed to type L. For example, the illumination source is turned on and specified by spectral parameters L. L may specify a narrow or broadband source. In 604, the gap for the Fabry-Perot etalon is set to δi. The setting of the gap for the Fabry-Perot etalon results in spectrally filtered light, which is then imaged at an optical sensor. In some embodiments, the setting of the gap for the Fabry-Perot etalon results in spectrally filtered light, which then illuminates a target. For example, δi might set the Fabry-Perot etalon to a 500 nm gap for i=0. In 606, temperature readings for Te and Ts are captured. For example, the Fabry-Perot etalon Te and the illumination source Ts temperature readings are captured. In some embodiments, the measured temperature Te may be used to compensate for spectral pass band variations due to temperature drift of the Fabry-Perot etalon. In 608, an optical sensor image I(x,y,c) is captured. For example, an image I[x,y,c] is captured of the light scattered from a target that is illuminated using the light source and then filtered by Fabry-Perot etalon. In some embodiments, the optical sensor is a high definition RGB camera and the data image I has dimensions I[1920,1080,3].

In 610, the data image I and temperature data T is stored in the data scan memory indexed by δi. For example, each image I and temperature measurement T in the data scan memory is indexed by a specific gap setting δi. In 612, i is incremented; for example, the gap setting index i is increased by 1. In 614, it is determined whether i is less than Nδ. For example, the index i is compared to the maximum value Nδ. In the event that i is less than Nδ, control passes to 604. For example, in the event that the index i is less than the maximum Nδ, then the scanning dataset is not yet complete and the next Fabry-Perot etalon gap is set in 604 and the data capturing process continues in 606, 608, and 610. In the event that i is not less than Nδ, then control passes to 616. For example, in the event that the index i is greater than or equal to the maximum Nδ, the data capturing process loop ends. In 616, a READ signal is sent to the spectrum calculator to signal a full data scan is ready for processing. For example, the reader controller sends a signal READ to the spectrum calculator to signal that the data in the data scan memory is ready for processing. In 618, a target spectrum estimate S[λ] is calculated using data scan memory G[δ,I,T] and reconstruction matrix memory R[δ,λ, T]. For example, the spectrum calculator calculates a hyperspectral data cube estimate S(x,y,λ) of the target using the data G[δ,I,T] stored in the data scan memory and the reconstruction matrix R[δ,λ,T] stored in the reconstruction matrix memory. In some embodiments, the hyperspectral data cube estimate S(x,y,λ) can be calculated by multiplying the data scan matrix G[δ,I,T] by the reconstruction matrix R[δ,λ,T].

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a calibrated spectral measurement, comprising:
   a tunable Fabry-Perot etalon, wherein the tunable Fabry-Perot etalon has a settable gap;
   a detector, wherein the detector measures light intensity; and
   a processor configured to determine the calibrated spectral measurement, comprising:
      receive a measurement set of detected light intensities for a plurality of settable gaps, wherein the measurement set of detected light intensities is associated with a temperature condition of the system;
      select a reconstruction matrix from a plurality of reconstruction matrices based at least in part on the temperature condition of the system;
      multiply the measurement set of detected light intensities and the reconstruction matrix to obtain the calibrated spectral measurement, wherein the reconstruction matrix is based at least in part on calibration measurements, wherein for a calibration measurement a settable gap is selected and a set of input monochromatic source wavelengths is used to measure responses at the detector after transmission through the Fabry-Perot etalon, and wherein each input monochromatic source wavelength is also measured using a radiometer to scale detector measurements.

2. The system of claim 1, wherein the tunable Fabry-Perot etalon is disposed between an illumination source and a target.

3. The system of claim 1, wherein the tunable Fabry-Perot etalon is disposed between a target and the detector.

4. The system of claim 1, wherein the settable gap is one of a plurality of settable gaps spanning a settable gap range.

5. The system as in claim 4, wherein the settable gap range comprises 500 nm to 1500 nm.

6. The system as in claim 1, wherein the detector comprises one of the following: a monochrome detector, a multiple band detector, an RGB detector, an IR detector, or an RGB and IR detector.

7. The system as in claim 1, wherein the calibration measurement comprises one or more of the following: a tunable Fabry-Perot etalon temperature measurement, a source temperature measurement, or a detector temperature measurement.

8. The system as in claim 1, wherein the temperature condition of the system associated with the measurement set of detected light intensities is based on one or more of the following: a tunable Fabry-Perot etalon temperature, a source temperature, or a detector temperature.

9. The system as in claim 1, wherein the plurality of the sets of the calibration measurements are built into a calibration measurement matrix.

10. The system as in claim 9, wherein the reconstruction matrix is a linear model calculated from the calibration measurement matrix.

11. The system as in claim 1, wherein a simplified calibration measurement matrix is determined based on a subset of the sets of the calibration measurements.

12. The system as in claim 11, wherein the reconstruction matrix is a linear model calculated from the simplified calibration measurement matrix.

13. The system as in claim 11, wherein the calibrated spectral measurement is determined by multiplying a subset of the measurement set of detected light intensities and the reconstruction matrix.

14. The system as in claim 1, wherein a reduced reconstruction matrix is determined using a subset of reconstruction matrix data.

15. The system as in claim 14, wherein the calibrated spectral measurement is determined by multiplying a subset of the measurement set of detected light intensities and the reduced reconstruction matrix.

16. A method for determining a calibrated spectral measurement, comprising:
providing a tunable Fabry-Perot etalon, wherein the tunable Fabry-Perot etalon has a settable gap;
providing a detector, wherein the detector measures light intensity; and
determining, using a processor, the calibrated spectral measurement, comprising:
receiving a measurement set of detected light intensities for a plurality of settable gaps, wherein the measurement set of detected light intensities is associated with a temperature condition of the system;
selecting a reconstruction matrix from a plurality of reconstruction matrices based at least in part on the temperature condition of the system; and
multiplying the measurement set of detected light intensities and the reconstruction matrix to obtain the calibrated spectral measurement, wherein the reconstruction matrix is based at least in part on calibration measurements, wherein for a calibration measurement a settable gap is selected and a set of input monochromatic source wavelengths is used to measure responses at the detector after transmission through the Fabry-Perot etalon, and wherein each input monochromatic source wavelength is also measured using a radiometer to scale detector measurements.

17. A computer program product for determining a calibrated spectral measurement, the computer program product being embodied in a non-transitory computer readable storage medium and comprising computer instructions for:
receiving a light intensity measured by a detector; and
determining, using a processor, the calibrated spectral measurement, comprising:
receiving a measurement set of detected light intensities for a plurality of settable gaps, wherein the measurement set of detected light intensities is associated with a temperature condition of the system;
selecting a reconstruction matrix from a plurality of reconstruction matrices based at least in part on the temperature condition of the system; and
multiplying the measurement set of detected light intensities and the reconstruction matrix to obtain the calibrated spectral measurement, wherein the reconstruction matrix is based at least in part on calibration measurements, wherein for a calibration measurement a settable gap is selected and a set of input monochromatic source wavelengths is used to measure responses at the detector after transmission through the Fabry-Perot etalon, and wherein each input monochromatic source wavelength is also measured using a radiometer to scale detector measurements.

* * * * *